(12) United States Patent
Hickenboth et al.

(10) Patent No.: US 8,197,654 B2
(45) Date of Patent: Jun. 12, 2012

(54) METHODS FOR PREPARING AN ELECTRODEPOSITABLE COATING COMPOSITION

(75) Inventors: Charles R. Hickenboth, Cranberry Township, PA (US); Walter F. Kasper, Gibsonia, PA (US); James E. Poole, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 676 days.

(21) Appl. No.: 12/357,699

(22) Filed: Jan. 22, 2009

(65) Prior Publication Data
US 2010/0181198 A1 Jul. 22, 2010

(51) Int. Cl.
*C09D 5/44* (2006.01)
(52) U.S. Cl. ........ 204/489; 204/492; 204/496; 204/499; 204/500; 204/503; 204/509
(58) Field of Classification Search .................. 204/489, 204/492, 496, 499, 500, 503, 509
See application file for complete search history.

(56) References Cited

U.S. PATENT DOCUMENTS

| | | | | |
|---|---|---|---|---|
| 6,010,774 A * | 1/2000 | Kadokura et al. | ............ | 428/220 |
| 6,686,412 B1 * | 2/2004 | Berschel et al. | ............... | 524/507 |
| 6,887,360 B2 * | 5/2005 | Retzlaff et al. | ............... | 204/489 |
| 2005/0234175 A1 * | 10/2005 | Ko et al. | ........................ | 524/430 |
| 2006/0155022 A1 | 7/2006 | Hupp | | |
| 2007/0260012 A1 * | 11/2007 | Algrim et al. | .................. | 524/601 |

FOREIGN PATENT DOCUMENTS

| | | |
|---|---|---|
| CN | 1303885 A | 7/2001 |
| JP | 56-075596 | 6/1981 |
| JP | 57-040569 | 3/1982 |
| JP | 57-094595 | 6/1982 |
| JP | 10-183031 | 7/1998 |
| JP | 11-302576 | 11/1999 |
| WO | WO98/58030 | 12/1998 |

\* cited by examiner

*Primary Examiner* — Bruce Bell
(74) *Attorney, Agent, or Firm* — Steven W. Hays

(57) ABSTRACT

Methods for preparing an electrodepositable coating composition are provided comprising: (a) mixing a flatting agent with an electrodepositable resin; (b) combining the mixture of (a) with a pigment paste to form a flatting agent-pigment paste mixture; and (c) combining the flatting agent-pigment paste mixture of (b) with an electrodepositable resin. Methods of coating articles including electrodepositable coating compositions prepared by these methods, as well as processes for coating electroconductive substrates with compositions prepared by these methods are also provided.

23 Claims, No Drawings

METHODS FOR PREPARING AN ELECTRODEPOSITABLE COATING COMPOSITION

GOVERNMENT CONTRACT

The United States Government may have certain rights to this invention pursuant to Contract No. W15QKN-07-C-0048 awarded by the Armament Research, Development and Engineering Center ("ARDEC").

FIELD OF THE INVENTION

The present invention relates to, among other things, methods for preparing an electrodepositable coating composition.

BACKGROUND INFORMATION

Electrodeposition has gained popularity in the coatings industry because it can often provide higher paint utilization, outstanding corrosion resistance, and/or low environmental contamination as compared with non-electrophoretic coating methods. Both cationic and anionic electrodeposition are used commercially, with cationic often being more prevalent in applications desiring a high level of corrosion protection. Anionic electrodeposition is often used for decorative applications, particularly where low cost and decorative qualities are desired.

There are a number of applications in which it is desired to control the gloss of a coating layer applied by electrodeposition. Electrodepositable coating compositions having high gloss levels are readily achievable, but compositions with low gloss levels while maintaining acceptable smoothness of the cured film have been very difficult to achieve.

Traditional flatting agents used to reduce gloss in electrodepositable coating compositions typically include inorganic pigments and fillers, such as silicas, clays and/or talcs. While these materials are often effective in reducing gloss to a certain level, the amount of these materials often required to achieve a low gloss film not only may adversely impact the coating viscosity, but also the smoothness of the resultant cured film. It would therefore be desirable to have a method for making an electrodepositable coating composition that achieves a low gloss while maintaining acceptable smoothness of the cured film.

The present invention has been developed in view of the foregoing.

SUMMARY OF THE INVENTION

In certain respects, the present invention provides methods for preparing an electrodepositable coating composition comprising: (a) mixing a flatting agent with an electrodepositable resin; (b) combining the mixture of (a) with a pigment paste to form a flatting agent-pigment paste mixture; and (c) combining the flatting agent-pigment paste mixture of (b) with an electrodepositable resin.

In other respects, the present invention is directed to a process for coating an electroconductive substrate comprising: electrophoretically depositing on at least a portion of the substrate a curable electrodepositable coating composition formed by a method comprising: (a) mixing a flatting agent with an electrodepositable resin; (b) combining the mixture of (a) with a pigment paste to form a flatting agent-pigment paste mixture; and (c) combining the flatting agent-pigment paste mixture of (b) with an electrodepositable resin.

These and other respects will become more apparent from the following description.

DETAILED DESCRIPTION

Other than in the operating examples, or where otherwise indicated, all numbers expressing quantities of ingredients, reaction conditions and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

In this application, the use of singular includes the plural and plural encompasses singular, unless specifically stated otherwise. In addition, in this application, the use of "or" means "and/or" unless specifically stated otherwise, even though "and/or" may be used in certain instances.

In certain embodiments, the present invention provides a method for preparing an electrodepositable coating composition wherein the method comprises: (a) mixing a flatting agent with an electrodepositable resin; (b) combining the mixture of (a) with a pigment paste to form a flatting agent-pigment paste mixture; and (c) combining the flatting agent-pigment paste mixture of (b) with an electrodepositable resin.

In certain embodiments, to prepare the mixture of (a) (hereinafter also referred to as "flatting agent mixture of (a)"), a flatting agent is combined and mixed together with an electrodepositable resin. As used herein, the term "flatting agent" refers to a material added to a coating composition to reduce the gloss of a coating film deposited from such a composition.

One or more of a variety of flatting agent(s) may be used in the flatting agent mixture of (a) as necessary to impart the desired properties to a film deposited from the electrodepositable coating compositions prepared in accordance with the methods of the present invention, including, for example, gloss, smoothness, appearance, etc. Non-limiting examples of suitable flatting agent(s) include, for example, silicas, clays, talcs, barites, calcium carbonate, barium sulfate, aluminum silicates, sodium aluminum silicates, hollow spheres of alumina silicate, potassium aluminum silicates, magnesium silicate, or combinations thereof. The flatting agent(s) may be in a variety of forms, for example, the flatting agent(s) may be treated or untreated and may be a variety of particle sizes. Any combination of treated and/or untreated flatting agent(s) in a variety of particle sizes may be used in the flatting agent mixture of (a).

The amount of flatting agent present in the flatting agent mixture of (a) may vary depending on the desired gloss, smoothness, and/or other properties of the applied films. In certain embodiments, the amount of flatting agent present in the flatting agent mixture of (a) is sufficient to provide a low gloss to an applied film. Typically, as is known in the art, gloss is measured using an appropriate instrument at a given angle, often 60 degree. Appropriate instruments for measuring gloss include, but are not limited to, the Novo Gloss Statistical Glossmeter available from Rhopoint Instrumentation Ltd., East-Sussex, U.K. and the Haze-gloss Reflectometer available from BYK-Gardner USA, Columbia, Md. As used herein, the term "low gloss" generally refers to gloss readings of 20 or below, as measured at a 60 degree angle.

As discussed above, the amount of flatting agent present in the flatting agent mixture of (a) may also vary depending on the desired smoothness of the applied film. Typically, as is known in the art, smoothness of a coating film may be measured by any suitable means, such as for example, by visual inspection of the film. Additionally, smoothness may be measured using an appropriate instrument. Appropriate instruments for measuring smoothness include, but are not limited to, the Surtronic 3+ Profilometer, available from Taylor-Hobson.

In certain embodiments, the flatting agent is present in the flatting agent mixture of (a) from 0.5 to 75 percent weight solids, such as from 10 to 60 percent weight solids, such as from 25 to 50 percent weight solids, based on the total weight of solids of the flatting agent mixture of (a).

In certain embodiments, the flatting agent comprises silica. The type of silica is not limited and may include, for example, silica in its crystalline form, amorphous form, precipitated form, or combinations thereof. In certain embodiments, the silica particles may be treated, untreated, or combinations thereof. In other embodiments, the silica particles may be various particle sizes. Examples of suitable silicas include, but are not limited to, those sold under the name ACEMATT® designated OK412, OK412LC, OK500, OK520, OK607 (Degussa Corporation, AG). Any combination of the aforementioned silica types, treatments, and/or particle sizes may be used in the flatting agent mixture of (a) when desired.

As with other flatting agent(s), the amount of silica present in the flatting agent mixture of (a) may vary depending on the desired gloss, smoothness, and/or other properties of the applied films. In certain embodiments, the amount of silica present in the flatting agent mixture of (a) is sufficient to provide a low gloss to an applied film. In certain embodiments, the silica is present from 0.5 to 75 percent weight solids, such as from 10 to 60 percent weight solids, such as from 25 to 50 percent weight solids, based on the total weight of solids of the flatting agent mixture of (a).

In certain embodiments of the methods of the present invention, the flatting agent is mixed with an electrodepositable resin. As used herein, the term "electrodepositable resin" refers to a resin that is ionic in nature and may be applied to a substrate via electrodeposition, that is, a coating application method that involves deposition of a film-forming composition onto a conductive substrate under the influence of an applied electrical potential. The electrodepositable resins useful in the methods of the present invention may contain anionic functional groups to impart a negative charge or cationic functional groups to impart a positive charge.

In certain embodiments, the electrodepositable resins used in the methods of the present invention may be water dispersible. As used herein, the term "water dispersible" means able to be solubilized, dispersed or emulsified in water. In certain non-limiting embodiments, the water dispersible electrodepositable resin may optionally contain coalescing solvents such as hydrocarbons, alcohols, esters, ethers and/or ketones. The amount of coalescing solvent is generally from 0.01 to 25 percent, such as from 0.05 to 10 percent by weight based on the total weight of the aqueous medium.

In certain embodiments, the electrodepositable resins useful in the methods of the present invention may have number average molecular weights (Mn) ranging from 1,000 to 20,000, such as from 1,000 to 10,000. In other embodiments, the electrodepositable resins may have a resin solids content usually from 5 to 50 weight percent, such as from 10 to 35 weight percent, based on the total weight of the electrodepositable resin.

In certain embodiments, the electrodepositable resin of the methods of the present invention is an ungelled resin. As used herein, the term "ungelled" means the resins are substantially free of crosslinking and have an intrinsic viscosity when dissolved in a suitable solvent, as determined, for example, in accordance with ASTM-D1795 or ASTM-D4243. The intrinsic viscosity of the resin is an indication of its molecular weight. A gelled resin, on the other hand, since it is of essentially infinitely high molecular weight, will have an intrinsic viscosity too high to measure.

Non-limiting examples of anionic electrodepositable resins suitable for use in the coating compositions in the methods of the present invention, include base-solubilized, carboxylic acid group-containing resins such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable resin comprises an alkyd-aminoplast vehicle, i.e., a vehicle containing an alkyd resin and an amine-aldehyde resin. Another suitable anionic resin composition comprises mixed esters of a resinous polyol. These compositions are described in detail in U.S. Pat. No. 3,749,657 at col. 9, lines 1 to 75 and col. 10, lines 1 to 13. Other acid functional resins can also be used such as phosphatized polyepoxide or phosphatized acrylic polymers as are well known to those skilled in the art. Additionally, suitable for use are those resins comprising one or more pendant carbamate functional groups, for example, those described in U.S. Pat. No. 6,165,338. Combinations of any of the above described electrodepositable anionic resins may be used in the methods of the present invention.

In certain embodiments, the electrodepositable resin comprises an ungelled cationic resin. In these embodiments, the electrodepositable resin is cationic in nature, that is, the polymer contains cationic functional groups and active hydrogen-containing groups. Suitable cationic functional groups present in the cationic resin include, but are not limited to, amine salts, quaternary ammonium salts and/or sulfonium salts. Generally, the cationic resin contains from 0.1 to 3.0, such as from 0.1 to 0.7, millequivalents of cationic salt group per gram of resin solids.

A wide variety of electrodepositable cationic resins are known and can be used in the methods of the present invention. Suitable non-limiting examples of ungelled cationic resins include, but are not limited to one or more of a polyepoxide resin, a vinyl resin (also referred to herein as an "acrylic" resin), a polyurethane resin, a polyester resin, a polyether resin, copolymers thereof and/or combinations thereof, for example a polyester-polyurethane resin. Any of a variety of polyepoxides known in the related art can be used to form the cationic resin. The polyepoxide can be aromatic, araliphatic or aliphatic in nature. The polyepoxides which may be used in the practice of the invention are polymers having a 1,2-epoxy equivalency greater than one and preferably about two, that is, polyepoxides which have on an average basis two epoxy groups per molecule. Suitable polyepoxides include polyglycidyl ethers of cyclic polyols, and polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydrorxyphenyl)propane, 1,1-bis-(4-hydroxyphenyl)ethane, 2-methyl-1,1-bis-(4-hydroxyphenyl)propane, 2,2-bis-(4-hydroxy-3-tertiarybutylphenyl)propane, bis-(2-hydroxynaphthyl)methane or the like.

Besides polyhydric phenols, other cyclic polyols can be used in preparing the polyglycidyl ethers of cyclic polyol derivatives. Examples of other cyclic polyols would alicyclic polyols, particularly cycloaliphatic polyols, such as 1,2-cyclohexanediol, 1,4-cyclohexanediol, 1,2-bis-(hydroxymethyl)cyclohexane, 1,3-bis-(hydroxymethyl)cyclohexane and hydrogenated bisphenol A.

Also suitable are polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)-2,2-propane, and the like. Another class of polyepoxides are those containing oxyalkylene, or polyether linkages in the epoxy molecule, such as those described in U.S. Pat. Nos. 4,001,101 and 4,001,156.

Non-limiting examples of such cationic resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Also suitable are sulfonium salt group-containing resins, such as those described in U.S. Pat. No. 3,793,278. Additional polyepoxide resins that are suitable for use in forming the cationic resin include those described in U.S. Pat. Nos. 4,755,418, 5,948,229 and 6,017,432.

Besides amine salt and sulfonium group-containing resins, quaternary ammonium salt group-containing resins can also be employed. Examples of these resins are those that are formed from reacting an organic polyepoxide with a tertiary amine salt. Such resins are described in U.S. Pat. Nos. 3,962,165; 3,975,346; and 4,001,101.

Polyurethanes can also be used as the polymer from which the cationic resin can be derived. Among the polyurethanes that can be used are polymeric polyols which are prepared by reacting polyester polyols or acrylic polyols, such as those mentioned above, with a polyisocyanate such that the OH/NCO equivalent ratio is greater than 1:1 so that free hydroxyl groups are present in the product. Smaller polyhydric alcohols, such as those disclosed above for use in the preparation of the polyester, may also be used in place of or in combination with the polymeric polyols.

Additional examples of polyurethane polymers suitable for forming the cationic resin are the polyurethane, polyurea, and poly(urethane-urea) polymers prepared by reacting polyether polyols and/or polyether polyamines with polyisocyanates, as described in U.S. Pat. No. 6,248,225.

Epoxide functional groups may be incorporated into the polyurethane by, for example, reacting glycidol with free isocyanate groups. Alternatively, hydroxyl groups on the polyurethane can be reacted with an epihalohydrin or dihalohydrin such as epichlorohydrin or dichlorohydrin in the presence of alkali.

Sulfonium group-containing polyurethanes can also be made by at least partial reaction of hydroxy-functional sulfide compounds, such as thiodiglycol and thiodipropanol, which results in incorporation of sulfur into the backbone of the polymer. The sulfur-containing polymer is then reacted with a monofunctional epoxy compound in the presence of acid to form the sulfonium group. Appropriate monofunctional epoxy compounds include ethylene oxide, propylene oxide, glycidol, phenylglycidyl ether, and the product under the trademark CARDURA E, available from Resolution Performance Products.

Besides the above-described polyurethane and polyepoxide polymers, the cationic resin can be derived from a polyester. Such polyesters can be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, and pentaerythritol. Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

The polyesters contain a portion of free hydroxyl groups (resulting from the use of excess polyhydric alcohol and/or higher polyols during preparation of the polyester) which are available for cure reactions. Epoxide functional groups may be incorporated into the polyester by reacting carboxyl groups on the polyester with an epihalohydrin or dihalohydrin such as epichlorohydrin or dichlorohydrin.

Sulfonium salt groups can be introduced by the reaction of an epoxy group-containing polymer of the types described above with a sulfide in the presence of an acid, as described in U.S. Pat. Nos. 3,959,106 and 4,715,898. Sulfonium groups can be introduced onto the polyester backbones described using similar reaction conditions. Further examples of suitable electrodepositable polyester compositions are described in U.S. Pat. No. 6,423,774.

In certain embodiments, the ungelled cationic resin comprises a cationic acrylic resin. Suitable cationic acrylic resins can include copolymers of one or more alkyl esters of acrylic acid or methacrylic acid optionally together with one or more other polymerizable ethylenically unsaturated monomers. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include nitriles, such acrylonitrile and methacrylonitrile, vinyl and vinylidene halides, such as vinyl chloride and vinylidene fluoride and vinyl esters, such as vinyl acetate. Acid and anhydride functional ethylenically unsaturated monomers, such as acrylic acid, methacrylic acid or anhydride, itaconic acid, maleic acid or anhydride, or fumaric acid may be used. Amide functional monomers including acrylamide, methacrylamide, and N-alkyl substituted (meth)acrylamides are also suitable.

Functional groups such as hydroxyl and amino groups can be incorporated into the acrylic polymer by using functional monomers, such as hydroxyalkyl acrylates and methacrylates or aminoalkyl acrylates and methacrylates. Epoxide functional groups (for conversion to cationic salt groups) may be incorporated into the acrylic polymer by using functional monomers, such as glycidyl acrylate and methacrylate, 3,4-epoxycyclohexylmethyl(meth)acrylate, 2-(3,4-epoxycyclohexyl)ethyl(meth)acrylate, or allyl glycidyl ether. Alternatively, epoxide functional groups may be incorporated into the acrylic polymer by reacting carboxyl groups on the acrylic polymer with an epihalohydrin or dihalohydrin, such as epichlorohydrin or dichlorohydrin.

The acrylic resin can be prepared by traditional free radical initiated polymerization techniques, such as solution or emulsion polymerization, as known in the art, using suitable catalysts which include organic peroxides and azo type compounds and optionally chain transfer agents, such as alpha-methyl styrene dimer and tertiary dodecyl mercaptan. Additional non-limiting acrylic polymers which are suitable for forming the active hydrogen-containing, cationic resin, which can be used in the electrodepositable compositions of the present invention, include those described in U.S. Pat. Nos. 3,455,806 and 3,928,157.

As previously discussed, in particular embodiments of the present invention, the electrodepositable resin has cationic salt groups. In these instances, such cationic salt groups typically are formed by solubilizing the resin with an inorganic or organic acid such as those conventionally used in electrodepositable coating compositions. Suitable examples of solubilizing acids include, but are not limited to, sulfamic, acetic, lactic, alkanesulfonic such as methanesulfonic, and formic acids. Sulfamic and lactic acids are most commonly employed.

Combinations of any of the above-described electrodepositable cationic resins also can be used advantageously in the methods of the present invention.

In certain embodiments, the electrodepositable resin may further comprise a curing agent, reactive with the active hydrogens of the electrodepositable resins described above. Note that the terms "curing agent" and "crosslinking agent" are used interchangeably. Blocked organic polyisocyanate and aminoplast curing agents are suitable for use in the present invention, although blocked isocyanates typically are employed for cathodic electrodeposition.

Aminoplast resins are the condensation products of amines or amides with aldehydes. Examples of suitable amine or amides are melamine, benzoguanamine, urea and similar compounds. Generally, the aldehyde employed is formaldehyde, although products can be made from other aldehydes such as acetaldehyde and furfural. The condensation products contain methylol groups or similar alkylol groups depending on the particular aldehyde employed. Most often, these methylol groups are etherified by reaction with an alcohol. Various alcohols employed include monohydric alcohols containing from 1 to 4 carbon atoms such as methanol, ethanol, isopropanol, and n-butanol, with methanol being preferred Aminoplast resins are commercially available from CYTEC Industries, Inc. under the trademark CYMEL and from Monsanto Chemical Co. under the trademark RESIMENE.

The aminoplast curing agents, when present, typically are utilized in conjunction with an active hydrogen-containing anionic polymer and are present in amounts ranging from about 5 to 50 percent by weight, often from 5 to 25 percent by weight, the percentages based on the total weight of the resin solids in the composition.

The curing agents commonly employed in cathodic electrodeposition compositions are blocked polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30, which are incorporated by reference herein.

The polyisocyanate curing agents typically are utilized in conjunction, with the active hydrogen-containing cationic electrodepositable resin in amounts ranging from ranging from 5 to 50 percent by weight, usually 10 to 35 percent by weight, based on total weight of resin solids in the composition.

Also suitable are beta-hydroxy urethane curing agents such as those described in U.S. Pat. Nos. 4,435,559 and 5,250,164. Such beta-hydroxy urethanes are formed from an isocyanate compound, for example, any of those described immediately above, a 1,2-polyol and/or a conventional blocking such as monoalcohol. Also suitable are the secondary amine blocked aliphatic and cycloaliphatic isocyanates described in U.S. Pat. Nos. 4,495,229 and 5,188,716.

The amount of electrodepositable resin present in the flatting agent mixture of (a) may vary depending on the desired properties of the flatting agent mixture of (a), for example, viscosity, weight solids, resin solids, ratio of flatting agent to resin solids, etc. In certain embodiments, the electrodepositable resin may be present in the flatting agent mixture of (a) in amounts ranging from 10 to 99 percent weight solids, such as from 20 to 75 percent weight solids, such as from 30 to 55 percent weight solids, based on the total weight solids of the flatting agent mixture of (a).

In certain embodiments, the flatting agent mixture of (a) may further comprise water. The amount of water present in the flatting agent mixture of (a) may vary to impart the desired properties and/or characteristics, including, for example, weight solids, viscosity, etc., and any suitable amount may be present. In certain embodiments, water, if present, is present from 5 to 95 percent by weight, based on the total weight of the flatting agent mixture of (a).

In other embodiments, the flatting agent mixture of (a) may further comprise a base. Non-limiting examples of suitable bases include, for example, amines, ammonia, carbonates, hydroxides, alkoxides, hydrides, or combinations thereof. One or more suitable bases may be used in the flatting agent mixture of (a). In certain embodiments, the base may used in the flatting agent mixture of (a) in undiluted form, while in other embodiments, the base may be pre-diluted with another material, for example, water, and used in the flatting agent mixture of (a).

If present, the amount of base present in the flatting agent mixture of (a) may vary, and any suitable amount may be used. In certain embodiments, the base, if present, is present in the flatting agent mixture of (a) from 0.01 to 10 weight percent, such as from 0.1 to 5 weight percent, based on the total weight of the flatting agent mixture of (a).

In certain embodiments, the base comprises a nitrogen-containing base. Non-limiting examples of suitable nitrogen-containing bases include, for example, amines, including, primary amines, secondary amines, and tertiary amines, amidines, guanidines, or combinations thereof. In certain embodiments, the nitrogen-containing base comprises a tertiary amine. In other embodiments, the tertiary amine comprises dimethylethanolamine. As described above, in certain embodiments, the amine may be used in the flatting agent mixture of (a) in undiluted form, while in other embodiments, the amine may be pre-diluted with another material, such as for example, water, and used in the flatting agent mixture of (a). The amount of amine present in the flatting agent mixture of (a), if present, may vary. In certain embodiments, the amine, if present, is present in the mixture of (a) from 0.01 to 10 weight percent, such as from 0.1 to 5 weight percent, based on the total weight of the flatting agent mixture of (a).

In certain embodiments, the flatting agent mixture of (a) may further comprise a coalescent. Non-limiting examples of suitable coalescents include fatty acid alkylene glycol monoesters (e.g., those compounds sold under the tradename Archer RC™ from Archer Daniels Midland), aromatic alkoxylates (e.g., cresol propoxylates such as those compounds sold under the tradename PLURACOAT™, including PLURACOAT™ CA120, PLURACOAT™ CA 110, and PLURACOAT™ CA100), those compounds sold under the tradename EDENOL™ from Cognis (e.g., EDENOL™ EFC 100), those compounds sold under the tradename OPTIFILM™ from Eastman Chemical (e.g., OPTIFILM™ Enhancer 400), dialkylene glycols such as dipropylene glycol, trialkylene glycols such as tripropylene glycol, and the like, or combinations thereof. Other suitable coalescents include, but are not limited to, 2-ethylhexyl ether of ethylene glycol (e.g., commercially available from Eastman Chemical as Eastman™ EEH solvent), alkyl esters of aromatic carboxylic acids (e.g., 2-ethylhexyl benzoate and/or those compounds sold under the tradename Velate™ 368 from Velsicol Chemical Corp.), methyl carbitol, propylene glycol, ethylene glycol, optionally-alkyl-substituted alkanediol organic carboxylic acid monoesters (e.g., 2,2,4-trimethyl-1,3-pentanediol monoisobutyrate and those compounds sold under the tradename Texanol™ from Eastman Chemical), phosphate salts such as potassium tetrapyrophosphate, plasticizers such as dibutyl phthalate, and the like, or combinations thereof.

If present, the amount of coalescent present in the flatting agent mixture of (a) may vary, and any suitable amount may be used. In certain embodiments, the coalescent, if present, is present in the flatting agent mixture of (a) from 0.1 to 15 weight percent, such as from 1 to 10 weight percent, based on the total weight of the flatting agent mixture of (a).

In other embodiments, the mixture of (a) may further comprise an organic solvent. Non-limiting examples of suitable organic solvents include, for example, hydrocarbons, acetates, alcohols, esters, ethers, ketones, or combinations thereof. The amount of organic solvent present in the flatting agent mixture of (a), if present, may vary, and any suitable amount may be used. In certain embodiments, the organic solvent, if present, is present in the flatting agent mixture of (a) from 0.1 to 15 weight percent, such as from 1 to 10 weight percent, based on the total weight of the flatting agent mixture of (a).

In certain embodiments, the flatting agent mixture of (a) may further comprise a polymerizable ethylenically unsaturated compound. Suitable polymerizable ethylenically unsaturated compounds for use in the methods of the present invention include, but are not limited to, copolymers prepared from one or more alkyl esters of acrylic acid and/or methacrylic acid such as, for example, methyl(meth)acrylate, ethyl(meth)acrylate, butyl(meth)acrylate, and/or 2-ethylhexyl(meth)acrylate. As used herein, the term "(meth)acrylate" and like terms is intended to include both methacrylates and acrylates. Non-limiting examples of other polymerizable ethylenically unsaturated compounds include vinyl aromatic compounds, such as styrene and/or vinyl toluene; nitriles, such as acrylonitrile and/or methacrylonitrile; vinyl and/or vinylidene halides, such as vinyl chloride and/or vinylidene fluoride and/or vinyl esters, such as vinyl acetate. Examples of epoxide functional ethylenically unsaturated compounds that may be used in the present invention include, but are not limited to, glycidyl(meth)acrylate, 3,4-epoxycyclohexylmethyl(meth)acrylate, 2-(3,4-epoxycyclohexyl)ethyl(meth)acrylate and/or allyl glycidyl ether. Combinations of one or more polymerizable ethylenically unsaturated compounds, including any of those described above, can be used in the flatting agent mixture of (a) in accordance with the methods of the present invention.

In certain embodiments, the polymerizable ethylenically unsaturated compound comprises butyl(meth)acrylate, styrene, or combinations thereof.

If present, the amount of polymerizable ethylenically unsaturated compound(s) present in the flatting agent mixture of (a) may vary, and any suitable amount may be used. In certain embodiments, the polymerizable ethylenically unsaturated compound(s), if present, is present in the flatting agent mixture of (a) from 0.1 to 50 percent weight solids, such as from 1 to 30 percent weight solids, such as from 5 to 20 percent weight solids, based on the total weight solids of the flatting agent mixture of (a).

In certain embodiments, the flatting agent mixture of (a) may further comprise an initiator. Non-limiting examples of suitable initiators include, for example, sodium metabisulfite, ferric ammonium sulfate, azo initiators (including, for example, those sold under the trade name VAZO 67), peroxides, including for example, t-butyl peroxide, t-butylhydroperoxide, and benzoylperoxide, or combinations thereof. If present, the amount of initiator in the flatting agent mixture of (a) may vary, and any suitable amount may be used. In certain embodiments, the initiator, if present, is present in the flatting agent mixture of (a) from 0.01 to 5 weight percent, such as from 0.1 to 1 weight percent, based on the weight solids of the electrodepositable resin of (a).

Many other additional materials may be optionally used in the flatting agent mixture of (a). Among these are surfactants, wetting agents, and defoamers. These are only exemplary; others may be used as desired. When present, the additional optional materials can be used in their customary amounts for their customary purposes.

In certain embodiments, the flatting agent mixture of (a) may be prepared by combining any of the materials discussed above and mixing them through agitation by any suitable means, such as with a stirring blade. The materials used to prepared the flatting mixture of (a) may be combined in any suitable order. In certain embodiments, the flatting agent mixture of (a) may be prepared at ambient temperature, while in other embodiments, elevated temperatures may be used. In still other embodiments, the flatting agent mixture of (a) may be prepared in the presence of an inert gas, such as, for example, nitrogen. In yet other embodiments, the flatting agent mixture of (a) may be prepared in the presence of ambient air.

In certain embodiments, the flatting agent mixture of (a) may be prepared in such a manner and under such conditions that no polymerization reaction takes place. That is, in certain embodiments, the ingredients present in the flatting agent mixture of (a) may be combined and agitated under conditions and in such a manner that no polymerization reaction occurs. As used herein, the term "polymerization reaction" refers to a process of reacting monomer molecules together in a chemical reaction to form polymer chains.

The amount of the flatting agent mixture of (a) present in an electrodepositable coating composition prepared according to methods of the present invention may vary according to the desired gloss, smoothness, and/or other properties of the applied films. In certain embodiments, the flatting agent mixture of (a) is present from 1 to 30 weight percent, such as from 2 to 20 weight percent, such as from 5 to 15 weight percent, based on the total weight of the electrodepositable coating composition. The amount of flatting agent(s) present in an electrodepositable coating composition may also be expressed as a flatting agent-to-binder ratio, wherein "binder" represents any resin(s) present in the coating composition, including, for example, any electrodepositable resin(s) as well as any grind resin(s), discussed below. In certain embodiments, the flatting agent mixture of (a) is present in the electrodepositable coating compositions prepared by the methods of the present invention to provide a flatting agent-to-binder ratio of from about 0.01 to about 1:1, such as from about 0.05 to about 0.5:1, based on the solid weight of flatting agent to solid weight of binders.

In certain embodiments, the flatting agent mixture of (a) may be combined with a pigment paste to form a flatting agent-pigment paste mixture. As used herein, the term "pigment paste" refers to a combination of one or more pigment composition(s) with a grind resin and, optionally, additives such as wetting or dispersing aids.

Generally, a pigment paste of an electrodepositable coating composition may be prepared by grinding and/or dispersing one or more pigment composition(s) with a suitable grind resin. Suitable pigment composition(s) typically include inorganic pigments, organic pigments, or combinations thereof. Non-limiting inorganic pigment composition(s) include, for example, iron oxides, china clay, titanium dioxide, talc, barium sulfate, antimony oxide, zinc oxide, calcium carbonate, magnesium silicate, and the like, or combinations thereof. Non-limiting organic pigment composition(s) include, for example, phthalocyanine green, phthalocyanine blue, carbon black, organic yellow, and the like, or combinations thereof. In certain embodiments, the pigment paste may also include one or more of any of the aforementioned flatting agent(s) or combinations thereof, suitable for use in the flatting agent mixture of (a). Typically, the particular pigment composition(s) as well as the amounts used, are chosen in accordance with the desired properties of the electrodepositable coating composition, for example, opacity, color, appearance, etc.

Suitable grind resins for use in the pigment paste may be selected from any grind resin known in the art as effective in grinding pigment compositions. The grind resins may be aqueous or non-aqueous. Combinations of one or more different grind resin(s) may be used. In certain embodiments, the grind resin(s) used in the pigment paste may be an electrodepositable resin, such as any of those electrodepositable resin(s) described above, or combinations thereof. Typically, the particular grind resin(s), as well as the amounts used, are chosen in accordance with the desired effectiveness in dispersing the particular pigment composition(s) as well as the desired properties of the electrodepositable coating composition, for example, opacity, color, appearance, etc. Typically, pigment content present in the pigment paste may be expressed as a pigment-to-binder ratio. In certain embodiments, the pigment-to-binder (grind resin) ratio of the pigment paste is within the range of about 0.1 to about 10:1, such as from about 0.5 to about 6:1, based on solid weight of the pigment composition(s) and grind resin(s).

Many other additional materials may be optionally used in the pigment paste. Among these are coalescing solvents, surfactants, wetting agents, defoamers, rheology modifiers, thixotropes, plasticizers, extenders, stabilizers, antioxidants, or combinations thereof, as are commonly used in the art. These are only exemplary; others may be used as desired. When present, the additional optional materials can be used in their customary amounts for their customary purposes. Typically, these additional optional materials, when present, will constitute from 0.01 to 15 weight percent based on the total weight of the pigment paste.

In general, the pigment paste may be present in an electrodepositable coating composition prepared in accordance with the methods of the present invention in any amount sufficient to impart the desired film properties to the applied film, e.g., film thickness, appearance, color, opacity, chip resistance, corrosion protection, etc. In certain embodiments, the pigment paste may be present such that the final electrodepositable coating composition has a pigment-to-binder ratio (electrodepositable resin(s) plus grind resin(s)) of from about 0.01 to about 1:1, such as from about 0.05 to about 0.5:1, based on solid weight.

As mentioned above, in certain embodiments, the flatting agent mixture of (a) may be combined with a pigment paste to form a flatting agent-pigment paste mixture. The flatting agent mixture of (a) may be combined with the pigment paste in any suitable order. In certain embodiments, the flatting agent mixture of (a) is added to the pigment paste and agitated by any suitable means, such as with a stirring blade, to form a flatting agent-pigment paste mixture of (b).

In certain embodiments, the flatting agent-pigment paste mixture of (b) may be combined with an electrodepositable resin of (c). In certain embodiments, the electrodepositable resin of (c) may be any of the electrodepositable resin(s) described above, or combinations thereof. In certain embodiments, the electrodepositable resin of (c) may further comprise any of the curing agent(s) described above.

In certain embodiments, the electrodepositable resin of (c) is the same as the electrodepositable resin of (a). In other embodiments, the electrodepositable resin of (c) is different from the electrodepositable resin of (a). In other embodiments, where an electrodepositable resin is present as a grind resin in the pigment paste, the electrodepositable resin of (c) may be the same as the electrodepositable resin present in the pigment paste. In still other embodiments, the electrodepositable resin of (c) may be different from the electrodepositable resin present in the pigment paste. In yet other embodiments, an electrodepositable resin may be present in each of (a), (b), and (c), and the electrodepositable resin may be the same in each of (a), (b), and (c). In other embodiments, an electrodepositable resin may be present in each of (a), (b), and (c), and the electrodepositable resin may be different in each of (a), (b), and (c).

The flatting agent-pigment paste of (b) and the electrodepositable resin of (c) may be combined in any suitable order. In certain embodiments, the flatting agent-pigment paste of (b) may be added to the electrodepositable resin of (c). Once combined, the materials may be agitated by any suitable means, such as with a stirring blade, to form an electrodepositable coating composition.

In general, the electrodepositable resin of (c) may be present in the electrodepositable coating compositions prepared according to the methods of the present invention in any amount sufficient to impart the desired visual and/or film properties to the applied film, e.g., film thickness, appearance, color, opacity, chip resistance, corrosion protection, etc. In certain embodiments, the electrodepositable resin of (c) may be present from 5 to 95 percent weight solids, such as from 20 to 80 percent weight solids, such as from 30 to 70 percent weight solids, based on the total solids of the electrodepositable coating composition.

In certain embodiments, the total amount of electrodepositable resin present in an electrodepositable coating composition prepared according to the methods of the present invention, whether the electrodepositable resin is present in (a), (b), or (c), or a combination thereof, is from 5 to 95 percent weight solids, such as from 10 to 85 percent weight solids, based on the total solids of the electrodepositable coating composition.

Many other additional materials may be optionally used in the electrodepositable coating compositions prepared by the methods of the present invention. Among these are coalescing solvents, surfactants, rheology modifiers, pigments, thixotropes, plasticizers, extenders, stabilizers, antioxidants, or combinations thereof, as are commonly used in the art. These are only exemplary; others may be used as desired. When present, the additional optional materials can be used in their customary amounts for their customary purposes.

A bath containing an electrodepositable coating composition prepared by the methods of the present invention may be any suitable total solids. In certain embodiments, a bath containing an electrodepositable coating composition of the present invention is from 1 to 50 weight percent, such as from 5 to 30 weight percent, based on total solids of the electrodepositable coating composition.

In certain embodiments, the electrodepositable coating compositions may be supplied as two components: (1) a clear resin feed, which includes, generally, the electrodepositable resin of (c), any curing agents (if present), and any additional non-pigmented components; and (2) the flatting agent-pigment paste mixture of (b), which, generally, includes the flatting agent mixture of (a) and the pigment paste as described above. An electrodepositable bath is typically prepared by combining components (1) and (2) with an aqueous medium which comprises water and, usually, coalescing solvents.

In other embodiments, the electrodepositable coating compositions of the methods of the present invention can be supplied as one component, that is, (a), (b), and (c) are combined and supplied as a one-component electrodepositable coating composition.

In certain embodiments, the present invention is directed to a method of coating an article comprising: (a) preparing an electrodepositable coating composition according to any of the methods described above; and (b) electrodepositing a coating deposited from the electrodepositable coating composition onto a substrate. Any electroconductive substrate known in the art, especially metal substrates such as steel, zinc, aluminum, copper, magnesium or the like can be coated with the electrodepositable composition of the present invention. It is customary to pretreat the substrate with a phosphate conversion, usually a zinc phosphate conversion coating, followed by a rinse which seals the conversion coating.

In certain embodiments, an article is at least partially coated with an electrodepositable coating composition prepared according to any of the methods described above.

A coating film deposited from an electrodepositable coating composition prepared according to the methods of the present invention may be any desired gloss. The gloss of the coating film may depend on such variables as, for example, the particular flatting agent(s) present and the amounts used; other pigment(s) present in the composition; thickness of the film; application and/or curing parameters, etc.

In certain embodiments, the coating electrodeposited onto the article is a low gloss coating. As mentioned above, as used herein, the term "low gloss" generally refers to gloss readings of 20 or below, as measured at a 60 degree angle. In certain embodiments, the coating electrodeposited onto the article has a gloss of 15 or below, such as 11 or below, such as 7 or below, as measured at a 60 degree angle.

In other embodiments, a coating film deposited from an electrodepositable coating composition prepared according to the methods of the present invention has a gloss lower than a coating film deposited from an electrodepositable coating composition prepared according to a method other than the methods of the present invention.

A coating film deposited from an electrodepositable coating composition prepared according to the methods of the present invention may be any desired smoothness. The smoothness of the coating film may depend on such variables as, for example, the particular flatting agent(s) present and the amounts used; other pigment(s) present in the composition; thickness of the film; application and/or curing parameters, etc. Typically, as is known in the art, smoothness of a coating film may be measured by any suitable means, such as for example, by visual inspection of the film. Additionally, smoothness may be measured using an appropriate instrument. Appropriate instruments for measuring smoothness include, but are not limited to, the Surtronic 3+ Profilometer, available from Taylor-Hobson.

In certain embodiments, the coating electrodeposited onto the article has a smoothness of less than 40 microinches, such as less than 30 microinches, such as less than 20 microinches. In other embodiments, a coating film deposited from an electrodepositable coating composition prepared according to the methods of the present invention has improved smoothness over a coating film deposited from an electrodepositable coating composition prepared according to a method other than the methods of the present invention.

In yet other embodiments, a coating film deposited from an electrodepositable coating composition prepared according to the methods of the present invention is low gloss and has improved smoothness over a coating film deposited from an electrodepositable coating composition prepared according to a method other than the methods of the present invention.

In certain embodiments, the present invention is directed to a process for coating an electroconductive substrate comprising electrophoretically depositing on at least a portion of the substrate a curable electrodepositable coating composition formed by a method comprising: (a) mixing a flatting agent with an electrodepositable resin; (b) combining the mixture of (a) with a pigment paste to form a flatting agent-pigment paste mixture; and (c) combining the flatting agent-pigment paste mixture of (b) with an electrodepositable resin.

An electrodeposition process typically involves immersing the electroconductive substrate into an electrodeposition bath of an aqueous electrodepositable composition, the substrate serving as a cathode in an electrical circuit comprising the cathode and an oppositely charged counter-electrode, i.e., an anode. Sufficient electrical current is applied between the electrodes to deposit a substantially continuous, adherent film of the electrodepositable coating composition onto the surface of the electroconductive substrate. The thickness of the electrodepositable coating applied to the substrate can vary based upon such factors as the type of substrate and intended use of the substrate, i.e., the environment in which the substrate is to be placed and the nature of the contacting materials.

Electrodeposition is usually carried out at a constant voltage in the range of from 1 volt to several thousand volts, typically between 50 and 500 volts. Current density is usually between 0.5 ampere and 15 amperes per square foot (5.4 to 161.5 amperes per square meter) and tends to decrease quickly during the electrodeposition process, indicating formation of a continuous self-insulating film. As discussed above, any electroconductive substrate known in the art, especially metal substrates such as steel, zinc, aluminum, copper, magnesium or the like can be coated with the electrodepositable composition of the present invention. It is customary to pretreat the substrate with a phosphate conversion, usually a zinc phosphate conversion coating, followed by a rinse which seals the conversion coating.

After deposition, the coating is often heated to cure the deposited composition. The heating or curing operation can be carried out at a temperature in the range of from 250 to 400° F. (121.1 to 204.4° C.), typically from 300 to 360° F. (148.8 to 182.2° C.), for a period of time ranging from 1 to 60 minutes. The thickness of the resultant film often ranges from 10 to 50 microns (0.39 to 1.96 mils).

The invention will be further described by reference to the following examples. Unless otherwise indicated, all weights are in grams and percentages are by weight.

EXAMPLES

Preparation of Flatting Agent Mixtures

A flatting agent mixture of Example A was prepared from the following ingredients:

Example A

| Material | Weight | Solids |
|---|---|---|
| Charge A | | |
| Electrodepositable Resin[1] | 505.23 | 126.46 |
| Flatting Agent[2] | 128.00 | 128.00 |
| Deionized Water | 303.00 | — |
| Coalescant[3] | 52.00 | 52.00 |
| Amine (10% aqueous)[4] | 33.00 | — |
| Deionized Water | 40.00 | — |
| Charge B | | |
| Deionized Water | 40.00 | — |
| Ferrous ammonium sulfate[5] | 0.01 | 0.01 |
| Tert-butylhydroperoxide[6] | 0.40 | 0.28 |
| Charge C | | |
| Deionized Water | 20.00 | — |
| Sodium metabisulfite[7] | 0.40 | 0.04 |
| | 1082.04 | 306.79 |

[1]An aqueous cationic acrylic resin at approximately 25% solids in water, available from PPG Industries, Inc.
[2]Hydrated Amorphous Silica available under the name ACEMATT OK412LC from Degussa AG.
[3]OPTIFILM 400, a coalescent at 100% solids commercially available from Eastman Kodak.
[4]10% by weight aqueous solution of dimethylethanolamine.
[5]Available from Sigma-Aldrich, Inc.
[6]Available from Sigma-Aldrich, Inc.
[7]Available from Sigma-Aldrich, Inc.

Preparation of Charge A: An electrodepositable resin was added to a 1 liter flask fitted with a stirrer and nitrogen inlet. The coalescent was added to the electrodepositable resin under agitation while purging with nitrogen. Next, water was added to the mixture, again under agitation while purging with nitrogen. The mixture was mixed under high speed agitation for 15 minutes. Next, a flatting agent was sifted into the mixture under agitation using the nitrogen purge. The aqueous amine solution was next added under agitation. No heat was used during Charge A. The ingredients of Charge A were added under high speed agitation over a time period of approximately one (1) hour. The mixture of Charge A was mixed under high speed agitation for approximately 10 minutes.

Preparation of Charge B: Charge B was added to Charge a Under agitation with a nitrogen purge. The mixture was permitted to mix under high speed agitation for approximately 5 minutes.

Preparation of Charge: Charge C was added to the mixture and agitated under high speed agitation for approximately 45 minutes. The theoretical % weight solids of Example A was approximately 28.6%.

A flatting agent mixture of Example B was prepared from the following ingredients:

Example B

| Material | Weight | Solids |
|---|---|---|
| Charge A | | |
| Electrodepositable Resin[1] | 505.84 | 126.46 |
| Flatting Agent[2] | 128.00 | 128.00 |
| Deionized Water | 303.00 | — |
| Butyl (Meth)acrylate[3] | 52.00 | 52.00 |
| Amine (10% aqueous)[4] | 33.00 | — |
| Deionized Water | 40.00 | — |
| Charge B | | |
| Deionized Water | 40.00 | — |
| Ferrous ammonium sulfate[5] | 0.01 | 0.01 |
| Tert-butylhydroperoxide[6] | 0.40 | 0.28 |
| Charge C | | |
| Deionized Water | 20.00 | — |
| Sodium metabisulfite[7] | 0.40 | 0.04 |
| | 1082.65 | 306.79 |

[1]An aqueous cationic acrylic resin at approximately 25% solids in water, available from PPG Industries, Inc.
[2]Hydrated Amorphous Silica available under the name ACEMATT OK412LC from Degussa AG.
[3]Available from Sigma-Aldrich, Inc.
[4]10% by weight aqueous solution of dimethylethanolamine.
[5]Available from Sigma-Aldrich, Inc.
[6]Available from Sigma-Aldrich, Inc.
[7]Available from Sigma-Aldrich, Inc.

Preparation of Charge A: An electrodepositable resin was added to a 1 liter flask fitted with a stirrer and nitrogen inlet. Butyl(meth)acrylate was added to the electrodepositable resin under agitation while purging with nitrogen. Next, deionized water was added to the mixture, again under agitation while purging with nitrogen. The mixture was mixed under high speed agitation for 15 minutes. Next, a flatting agent was sifted into the mixture under agitation using the nitrogen purge. The aqueous amine solution was next added under agitation. No heat was used during Charge A. The ingredients of Charge A were added under high speed agitation over a time period of approximately one (1) hour. The mixture of Charge A was mixed under high speed agitation for approximately 10 minutes.

Preparation of Charge B: Charge B was added to Charge a under agitation with a nitrogen purge. The mixture was permitted to mix under high speed agitation for approximately 5 minutes.

Preparation of Charge: Charge C was added to the mixture and agitated under high speed agitation for approximately 45 minutes. The theoretical % weight solids of Example B was approximately 35.0%.

Preparation of Pigment Pastes

Example C

A Pigment Paste was prepared from the following ingredients:

Example C

| Material | Weight | Solids |
|---|---|---|
| Grind Resin[9] | 1091.0 | 611.2 |
| Deionized Water | 500.0 | — |
| Phthalocyanine Blue[10] | 16.8 | 16.8 |
| Monoazo Pigment Yellow 151[11] | 221.9 | 221.9 |
| Red Iron Oxide[12] | 70.7 | 70.7 |
| Titanium Dioxide[13] | 11.5 | 11.5 |
| Deionized Water | 533.1 | — |
| | 2445.0 | 932.1 |

[9]An aqueous cationic epoxy grind resin at approximately 56% weight solids, available from PPG Industries, Inc.
[10]Phthalocyanine blue pigment available under the name SUNFAST BLUE 248-0061 from Sun Chemical.
[11]Yellow organic pigment available from Clariant Pigments.
[12]Red iron oxide pigment available under the name KRONA RED from Rockwood Pigments, N.A.
[13]Titanium dioxide pigment available under the name TIONA RCL-9 from Millenium Inorganics.

To prepare Example C, the Grind Resin and Deionized Water were charged into a metal beaker. A cowles blade was used to agitate these ingredients under medium speed. Each pigment was added separately and allowed to stir for approximately 5 minutes under medium agitation with the cowles blade prior to addition of the next pigment. Once all of the ingredients were added, the mixture was stirred under high agitation for approximately 15 minutes. Next, the mixture was charged into an Eiger Mini Motormill 250 containing zircoa media (1.2-1.7 millimeters diameter). The mixture was allowed to grind in the mill for approximately 15 minutes until a Hegman reading of 7 was achieved.

Example D

A Pigment Paste was prepared from the following ingredients:

Example D

| Material | Weight | Solids |
|---|---|---|
| Grind Resin[9] | 285.7 | 160.0 |
| Deionized Water | 412.0 | — |
| Phthalo Blue Pigment[10] | 4.4 | 4.4 |
| Organic Yellow Pigment[11] | 58.1 | 58.1 |
| Red Iron Oxide[12] | 18.5 | 18.5 |
| Silicon Dioxide[14] | 100.0 | 100.0 |
| Titanium Dioxide[13] | 3.0 | 3.0 |
| Flatting Agent[15] | 50.0 | 50.0 |
| Deionized Water | 533.1 | — |
| | 1464.8 | 394.0 |

[9]An aqueous cationic epoxy grind resin at approximately 56% weight solids, available from PPG Industries, Inc.
[10]Phthalocyanine blue pigment available under the name SUNFAST BLUE 248-0061 from Sun Chemical.
[11]Yellow organic pigment available from Clariant Pigments.
[12]Red iron oxide pigment available under the tradename Krona Red from Rockwood Pigments, N.A.
[13]Titanium dioxide pigment available under the TIONA RCL-9 from Millenium Inorganics.
[14]Silicon dioxide available under the name IMSIL A-8 from Unimin Corp.
[15]Hydrated Amorphous Silica available under the ACEMATT OK412LC from Degussa AG.

To prepare Example D, the Grind Resin, Deionized Water, followed by the pigments (in the order set forth above) were added to a mix tank and mixed under high speed agitation using a cowles blade for approximately 20 minutes. This mixture was added to a HM 1.5 liter Premier Mill charged with Zirconox media (0.8-1.0 millimeters diameter). The mixture was ground until a Hegman of 6.5 was achieved which required approximately two (2) passes through the mill.

Preparation of Electrodepositable Coating Compositions

Table 1 illustrates the ingredients for each electrodepositable coating composition prepared as described above:

TABLE 1

| Ingredients | Example 1 | Example 2 | Example 3 | Example 4 | Example 5 |
|---|---|---|---|---|---|
| Example A (from above) | — | — | 118.3 | — | — |
| Example B (from above) | — | — | — | 142.4 | 213.6 |
| Flatting Agent[16] | — | 14.0 | — | — | — |
| Example C (from above) | — | 173.1 | 158.0 | 173.1 | 173.1 |
| Example D (from above) | 262.8 | — | — | — | — |
| Deionized Water | 931.0 | 966.0 | 838.0 | 837.0 | 766.0 |
| Electrodepositable Resin[17] | 705.7 | 747.2 | 785.3 | 747.2 | 747.2 |
| | 1899.5 | 1,900.3 | 1,899.6 | 1,899.7 | 1,899.9 |
| Bath % Weight Solids | 15.0 | 15.0 | 15.0 | 15.0 | 15.0 |
| Bath Pigment:Binder Ratio | 0.200:1 | 0.172:1 | 0.168:1 | 0.168:1 | 0.204:1 |

[16]Hydrated Amorphous Silica available under the name ACEMATT OK412LC from Degussa AG.
[17]An aqueous cationic acrylic resin at approximately 25% solids in water, available from PPG Industries, Inc.

Example 1 (Comparative) illustrates an electrodepositable coating composition wherein the flatting agent (silica) is incorporated into Example D (Pigment Paste) along with the other pigments and ground using a mill as described above. To prepare Example 1, deionized water was added to Example D decrease the viscosity so that it was pourable, and thereby easily added to the electrodepositable resin. The mixture was then added to the electrodepositable resin under agitation and stirred under medium agitation for approximately 10 minutes. Then, the mixture was placed on a mixing bank and agitated at low speed overnight.

Example 2 (Comparative) illustrates an electrodepositable coating composition wherein the flatting agent (silica) is post-added to Example C (Pigment Paste) after Example C has been prepared by grinding in a mill as described above. To prepare Example 2, the flatting agent is added to Example C under medium agitation using a cowles blade. Once the flatting agent is added, the mixture is then agitated using a cowles blade under high-speed agitation for approximately 15 minutes. Deionized water was added to decrease viscosity of the mixture so that it was pourable, and thereby easily added to the electrodepositable resin. The mixture was then added to the electrodepositable resin under agitation and stirred for approximately 10 minutes. Then, the mixture was placed on a mixing bank and agitated at low speed overnight.

Example 3 illustrates an electrodepositable coating composition prepared by the method of the present invention wherein Example A was prepared as described above. To prepare Example 3, Example A was added to Example C (Pigment Paste). These ingredients were mixed under medium agitation using a mixing blade for approximately 2 to 3 minutes. Deionized water was added to decrease the viscosity of the mixture so that it was pourable, and thereby easily added to the electrodepositable resin. The mixture was then added to the electrodepositable resin under agitation and stirred under medium agitation for approximately 10 minutes. Then, the mixture was placed on a mixing bank and agitated at low speed overnight.

Example 4 illustrates an electrodepositable coating composition prepared by the method of the present invention wherein Example B was prepared as described above. To prepare Example 4, Example B was added to Example C (Pigment Paste). These ingredients were mixed under medium agitation using a mixing blade for approximately 2 to 3 minutes. Deionized water was added to decrease the viscosity of the mixture so that it was pourable, and thereby easily added to the electrodepositable resin. The mixture was then added to the electrodepositable resin under agitation and stirred under medium agitation for approximately 10 minutes. Then, the mixture was placed on a mixing bank and agitated at low speed overnight.

Example 5 illustrates an electrodepositable coating composition prepared by the method of the present invention wherein Example B (prepared as described above) is present at a higher level than in Example 4. To prepare Example 5, Example B was added to Example C (Pigment Paste). These ingredients were mixed together under medium agitation using a mixing blade for approximately 2 to 3 minutes. Deionized water was added to decrease viscosity of the mixture so that it was pourable, and thereby easily added to the electrodepositable resin. The mixture was then added to the electrodepositable resin under agitation and stirred under medium agitation for approximately 10 minutes. Then, the mixture was placed on a mixing bank and agitated at low speed overnight.

Electrocoating Procedure: Each of the Examples 1 through 5 were prepared as described above. Each composition of Examples 1 through 5 was placed into a container allowing each composition to be electrocoated onto a substrate. Each Example 1 through 5 was electrodeposited onto pretreated cold roll steel (CRS) substrate which had been pretreated with zinc/nickel/manganese phosphate followed by a non-chrome rinse (commercially available as CRS C710 C59 from ACT Laboratories). Bath temperature during the electrocoating process was approximately 90° F. (32.2° C.) and coat-out time was approximately two (2) minutes for each composition. Voltage was approximately 250 volts for each composition to achieve a cured film thickness of about 0.85 to 0.95 mils. After a deionized water rinse, the electrocoated test panels were subsequently cured in an electric oven at 350° F. (176.7° C.) for 30 minutes.

Testing Procedure: The cured electrocoat films produced by Examples 1 through 5 were evaluated for film thickness, 60 degree gloss, and film smoothness. Film thickness was measured using a Fischer Permascope. Recorded film thickness is based on an average of three (3) measurements. Film smoothness was measured using a Taylor-Hobson Surtronic 3+ Profilometer. Recorded film smoothness is the average of three (3) measurements and recorded in microinches. A lower number reflects improved smoothness. Gloss was measured using a Byk Gardner Glossmeter. A 60 degree gloss measurement was taken. Recorded 60 degree gloss is the average of three (3) measurements. A lower number reflects lower gloss. Results for film thickness, film smoothness and 60 degree gloss are reported in the following Table 2.

TABLE 2

| Example | Dry Film Thickness (mils) | Smoothness (microinches) | 60 degree Gloss |
| --- | --- | --- | --- |
| 1 | 0.85-0.95 | 45.7 | 14 |
| 2 | 0.85-0.95 | 44.3 | 12 |
| 3 | 0.85-0.95 | 29.0 | 11 |
| 4 | 0.85-0.95 | 19.7 | 7 |
| 5 | 0.85-0.95 | 25.3 | 2 |

It will be appreciated by those skilled in the art that changes could be made to the embodiments described above without departing from the broad inventive concept thereof. Whereas particular embodiments of this invention have been described above for purposes of illustration, it will be evident to those skilled in the art that numerous variations of the details of the present invention may be made without departing from the invention as defined in the appended claims.

We claim:

1. A method for preparing an electrodepositable coating composition comprising:
    (a) mixing a flatting agent with an electrodepositable resin;
    (b) combining the mixture of (a) with a pigment paste to form a flatting agent-pigment paste mixture; and
    (c) combining the flatting agent-pigment paste mixture of (b) with an electrodepositable resin;
    wherein the flatting agent comprises silica, clay, talc, barite, calcium carbonate, barium sulfate, aluminum silicate, sodium aluminum silicate, hollow spheres of alumina silicate, potassium aluminum silicate, magnesium silicate, or combinations thereof.

2. The method of claim 1, wherein the flatting agent is present in the mixture of (a) from 0.5 to 75 percent weight solids, based on total weight solids of the mixture of (a).

3. The method of claim 1, wherein the flatting agent comprises silica.

4. The method of claim 1, wherein the mixture of (a) further comprises water.

5. The method of claim 1, wherein the mixture of (a) further comprises a base.

6. The method of claim 1, wherein the base comprises a tertiary amine.

7. The method of claim 1, wherein the mixture of (a) further comprises a coalescent.

8. The method of claim 1, wherein the mixture of (a) further comprises an organic solvent.

9. The method of claim 1, wherein the mixture of (a) further comprises a polymerizable ethylenically unsaturated compound.

10. The method of claim 9, wherein the polymerizable ethylenically unsaturated compound comprises butyl(meth)acrylate, styrene, or combinations thereof.

11. The method of claim 1, wherein the mixture of (a) further comprises an initiator.

12. The method of claim 1, wherein no polymerization reaction takes place in the mixture of (a).

13. The method of claim 1, wherein the electrodepositable resin of (a) is the same as the electrodepositable resin of (c).

14. The method of claim 1, wherein the electrodepositable resin of (a) is different from the electrodepositable resin of (c).

15. The method of claim 1, wherein the electrodepositable resin comprises a water dispersible electrodepositable resin.

16. The method of claim 1, wherein the electrodepositable resin comprises an ungelled cationic resin.

17. The method of claim 16, wherein the ungelled cationic resin comprises a cationic acrylic resin.

18. A method of coating an article comprising:
(a) preparing an electrodepositable coating composition according to claim 1; and
(b) electrodepositing a coating deposited from the electrodepositable coating composition onto a substrate.

19. An article at least partially coated according to the method of claim 18.

20. The article of claim 19, wherein the coating is a low gloss coating.

21. The article of claim 20, wherein the coating has a gloss of 15 or below.

22. The article of claim 19, wherein the coating has a smoothness of less than 40 microinches.

23. A process for coating an electroconductive substrate comprising:
electrophoretically depositing on at least a portion of the substrate a curable electrodepositable coating composition formed by a method comprising:
(a) mixing a flatting agent with an electrodepositable resin;
(b) combining the mixture of (a) with a pigment paste to form a flatting agent-pigment paste mixture; and
(c) combining the flatting agent-pigment paste mixture of (b) with an electrodepositable resin;
wherein the flatting agent comprises silica clay talc barite calcium carbonate barium sulfate, aluminum silicate, sodium aluminum silicate, hollow spheres of alumina silicate, potassium aluminum silicate, magnesium silicate, or combinations thereof.

* * * * *